Dec. 19, 1939.  J. H. MILLER  2,183,687
SAUSAGE LINK FORMING MACHINE
Filed Jan. 27, 1937  6 Sheets-Sheet 1

Inventor
Joseph H. Miller
by Connolly Bros.
Attorney

Dec. 19, 1939.  J. H. MILLER  2,183,687
SAUSAGE LINK FORMING MACHINE
Filed Jan. 27, 1937   6 Sheets-Sheet 2
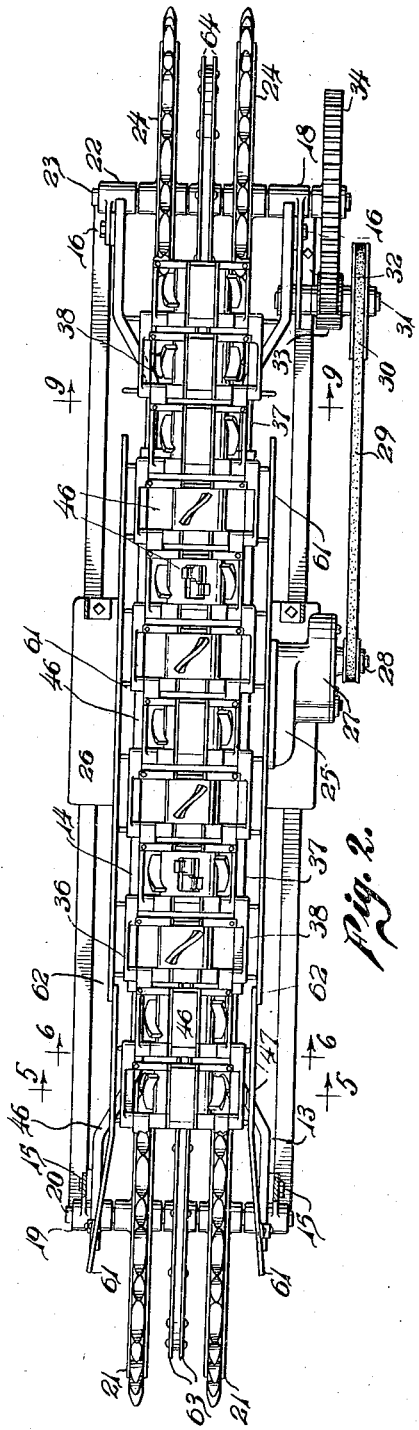
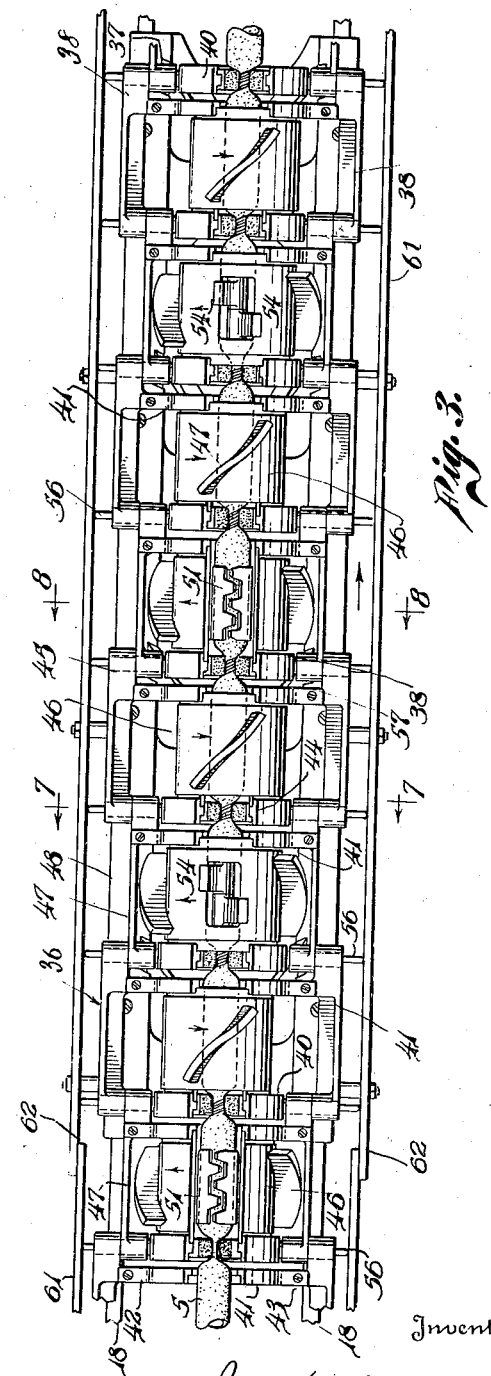
Inventor
Joseph H. Miller
By Connolly Bros
Attorney Dec. 19, 1939.     J. H. MILLER     2,183,687
SAUSAGE LINK FORMING MACHINE
Filed Jan. 27, 1937     6 Sheets-Sheet 3
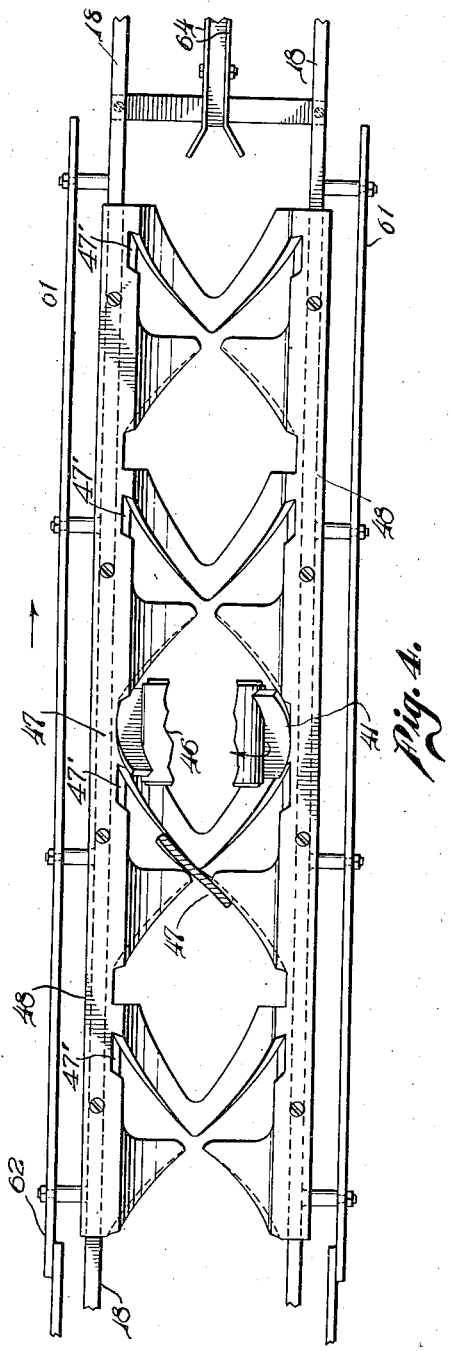
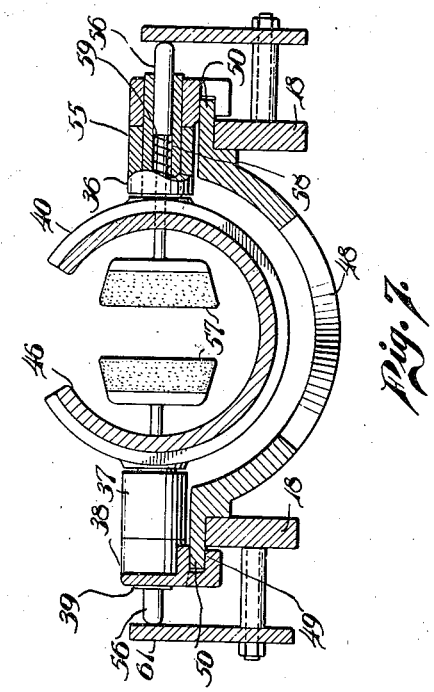
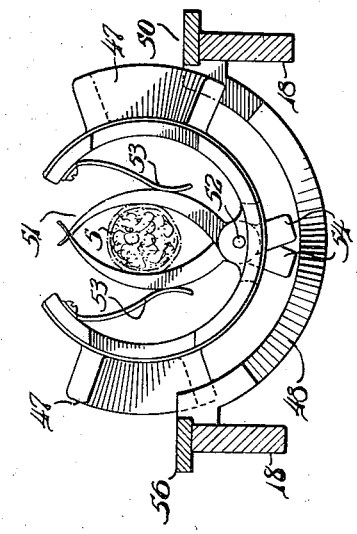
Inventor
Joseph H. Miller
By Connolly Bros
Attorney Dec. 19, 1939.　　　　J. H. MILLER　　　　2,183,687
SAUSAGE LINK FORMING MACHINE
Filed Jan. 27, 1937　　　　6 Sheets-Sheet 4

Inventor
Joseph H. Miller
By Connolly Bros
Attorney

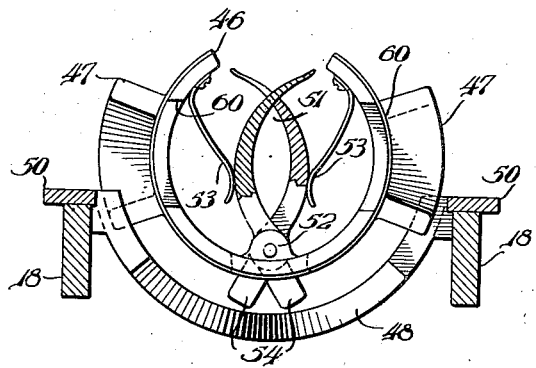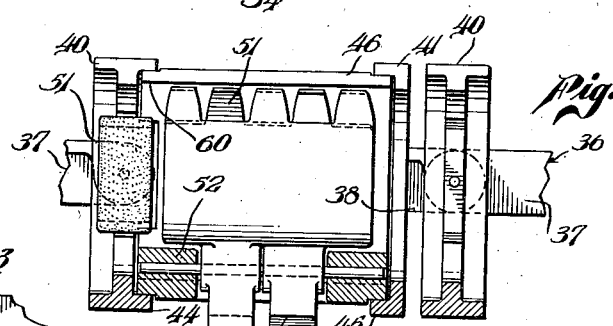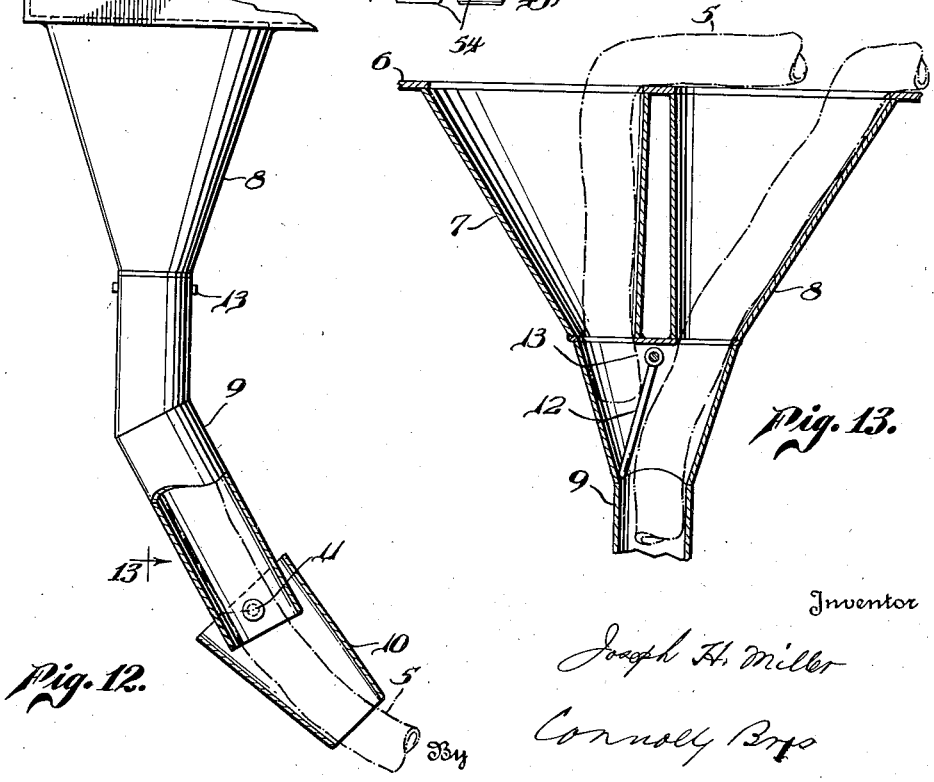

Dec. 19, 1939.　　　J. H. MILLER　　　2,183,687
SAUSAGE LINK FORMING MACHINE
Filed Jan. 27, 1937　　　6 Sheets-Sheet 6

Inventor
Joseph H. Miller
By Connolly Bros
Attorneys

Patented Dec. 19, 1939

2,183,687

UNITED STATES PATENT OFFICE 2,183,687

SAUSAGE LINK FORMING MACHINE

Joseph H. Miller, San Diego, Calif.

Application January 27, 1937, Serial No. 122,634

6 Claims. (Cl. 17—34)

This invention has relation to the manufacture of sausages of that character in which the stuffed or filled sausage casings of many feet in length are divided into individual sausages and formed into connected sausages by twisting the integument constituting the casing at intervals corresponding to the desired length of the sausages and thus producing a chain of linked sausages which may be afterwards separated or severed from the rest of the chain according to the dealer's or consumer's requirements.

The object of the invention is to provide a novel method and apparatus for the production of linked sausage units in which the several operations are automatic, expeditious, and economical and of such a character that the production of the linked sausages may be conducted on an unusual and extensive scale.

The invention as herein disclosed and claimed consists in the novel construction and combination of mechanically controlled elements having in view the accomplishment of the objects above mentioned and other objects to be hereinafter explained.

In Letters Patent of the United States, Number 1,839,043, heretofore granted to me on the 29th day of December 1931, I have shown and described a sausage link forming system and apparatus wherein the sausage casings filled with sausage meat and ready to be formed into links are fed through a series of drums located within a chute and equipped with means for compressing a length of filled sausage casing at measured points to provide necks and divide the unlinked stock into sausage units and with means for imparting rotary motion to said drums consecutively and for causing the neck portions to be twisted in each drum preparatory to the engagement of a following drum.

In the system disclosed in my former patent above referred to the operations are of an intermittent character in that each charge of the link forming mechanism is subjected to treatment resulting in the completion of the linking of each casing section or length prior to the insertion of another charge. According, however to my present invention means are provided whereby the operation of the link forming mechanism is substantially continuous and devoid of inactivity during certain periods incident to the necessity of completing the link forming operation on each separate charge of the material being treated before the starting of operations on another charge the effect being a loss of time on the part of the operators and a limitation of the productiveness of the actual link forming unit.

In a link forming equipment of the general character of my patented machine and of my present invention—a complete plant comprises a number of link forming units each constructed and adapted to completely form linked chains—it is intended to employ a number of units arranged in parallel relation and operated from a common source of power, the connections being such that one or more units can be operated at a time and that different units are so constructed and arranged as to permit of the formation of links of different lengths and thicknesses simultaneously or separately.

It is further proposed to increase the capacity of a link forming machine by the provision of means whereby the stuffed sausage stock or casings may be fed to the link forming devices in rapid succession and without the necessity of discontinuing the operations of the actual neck forming and twisting means to enable the twisted and linked sausages of a charge to be removed from the link forming means and the latter recharged.

It has been customary in the construction and operation of link forming machines to provide for the compression of the filled casings at prescribed intervals to form necks to be afterwards twisted to complete the formation of the links. Such compression or flattening of the filled casings has heretofore been accomplished as a single operation which has been found imperfect in that the single act of compression does not sufficiently displace the sausage material to produce a perfectly flattened neck adapted to be twisted in a desirable manner and result in uniformity of the neck portion of the links. To avoid this difficulty I have provided means whereby the necks of the sausage casings are produced by a gradually increasing pressure which effectively and without damage to the stock empties the casing at the neck forming points and produces neck portions of uniform and readily twistable character, and devoid of tendency of the linked sausages to untwist.

In the construction and operation of link forming machines it has been the practice to twist the sausages, after the forming of the necks, in one direction only. This has been found to be an imperfect system as the links have a tendency to untwist at the neck portions and lose much of their desirable character.

According to my present invention I have overcome this objection by the provision of means for twisting the sausages alternately in opposite directions during progress through the link forming devices whereby chains are produced with alternately right and left neck twists so that the tendency and liability of the links to untwist at one neck point will be resisted by the reverse twist of the sausage at another point.

In the link forming machine of my former patent the basic idea involves the use as instrumentalities of a tubular structure constituting a casing or chute arranged preferably in an inclined position and containing a series of drums which are adapted to receive a length or charge of stuffed sausage casing and provided with means for compressing the sausage casing and afterwards twisting the same to complete the link formation the twisting operations to be performed successively on the several units contained in the neck forming and twisting devices under and by the step-by-step movement axially of the drums, through which the sausage casing passes and in which the stuffed casing remains in a stationary condition during the neck forming and twisting of the stock, after which the linked section is removed and the link forming receiver recharged with another length of stock, to be similarly treated. The operation as before noted is intermittent, each charge being treated independently and each batch of linked sausages separately disposed of before treatment of other batches.

It is to be noted that according to the system disclosed in my former patent, in the neck forming and twisting operations I employ a series of drums arranged in serial order and adapted to receive the sausage charges or lengths of stock and hold the same in a stationary position while being treated, the drums having a limited movement axially to impart treatment to the several sections of the charge passing through the drums in successive order.

According to the present invention I have adopted the system embodied in my patent involving the use of the drums but instead of arranging the several drums of a single link forming unit within a chute or casing and limiting their movement to a short distance sufficient to communicate the movement of one drum to a succeeding drum I now propose the adoption of a system in which all the drums of a single link forming machine are mounted on an endless chain or carrier and caused to travel in one direction while during their progress the neck portions are produced and the twisting accomplished, the operations being continuous.

In the accompanying drawings illustrating a practical embodiment of my invention—

Fig. 2 is a section on the line 2—2 of Fig. 1 in which parts of the chain or conveyer are broken away to illustrate the driving mechanism.

Fig. 3 is an enlarged fragmentary view in plan of the linking mechanism.

Fig. 4 is a fragmentary plan view of the actuating cams of the linking mechanism.

Fig. 7 is a section on line 7—7 of Fig. 3.

Fig. 8 is a section on line 8—8 of Fig. 3, showing the sausage grippers in closed position.

Fig. 10 is a section similar to Fig. 3, showing the fully closed position of the grippers.

Fig. 11 is a vertical section through one of the link forming members.

Fig. 12 is a detail, partly in section of the feed tube for the passage of the unlinked sausage casings to the link forming devices.

Fig. 13 is a section on the line 13—13 in Fig. 12.

Figure 1:
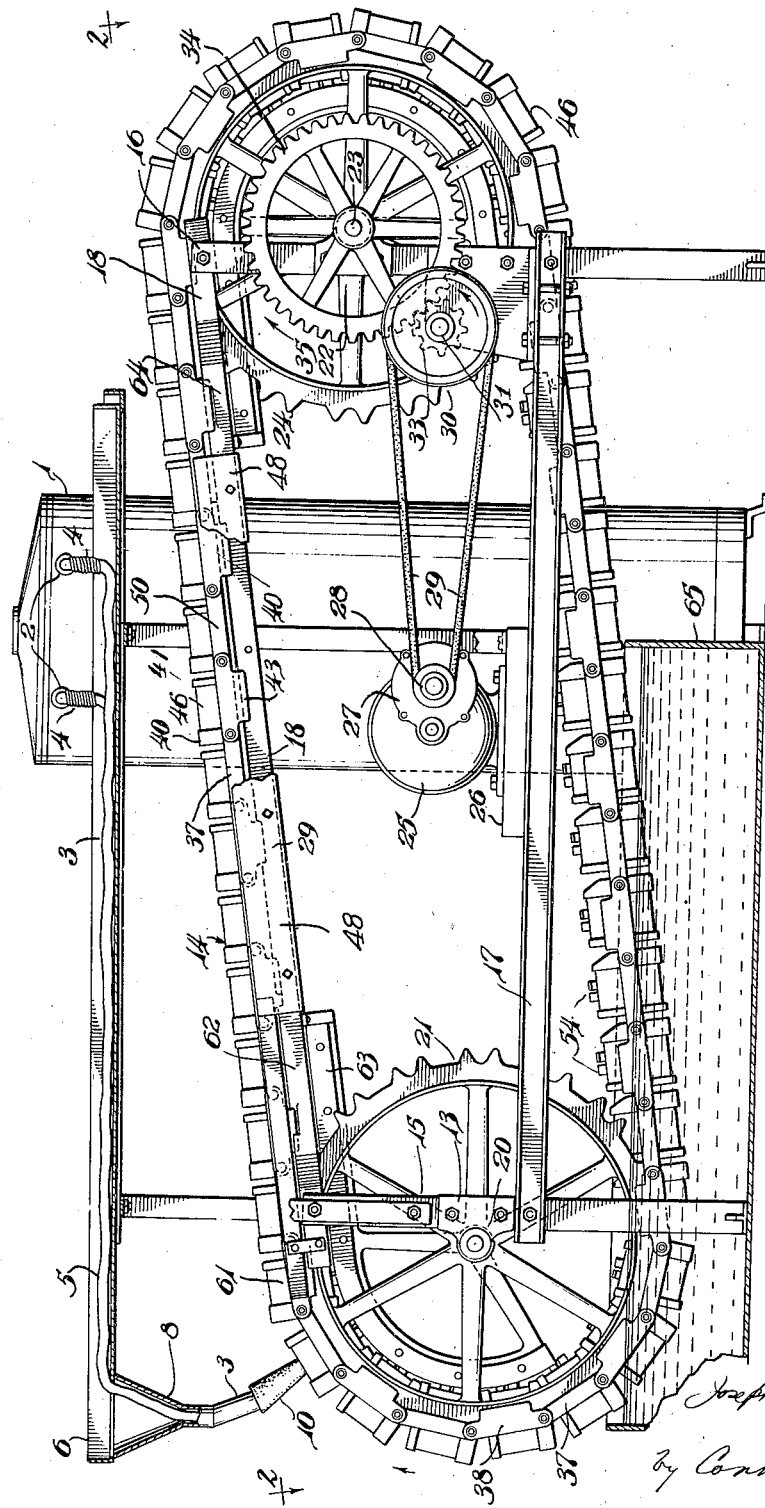
Fig. 1 is a side elevation of the linking machine constituting my invention.

The sausage linking machine embodying my invention is illustrated in the accompanying drawings which also illustrate a suitable magazine 1 to contain a supply of sausage stuffing to be forced, under pressure through a pair of spouts 2, into casings 3, previously threaded over spouts 2, as shown in Fig. 1 at 4.

In carrying my invention into effect the stuffed casings or sausages are deposited on a tray 6 and both casings, if two are being handled, are directed into individual funnels 7 and 8 depending from the tray 6.

The two funnels 7 and 8 terminate in a single spout 9 which is provided at its lower end with a flexible nozzle 10 hinged on the spout 9, as shown at 11. In the upper end of the spout which conjoins the funnels 7 and 8 a gate 12 is hinged as at 13.

In practice, when one sausage, for example is passed through the funnel 8 and spout 9 to the link forming devices, gate 12 is swung automatically by the passing sausage to the left, as viewed in Fig. 13, closing the opening to funnel 7. The leading end of the other sausage may then be inserted into funnel 7 to be in position for following the end of the first sausage to the link forming devices. The hinged nozzle 10 may be made of rubber or other flexible material to provide a yielding guide for the sausage to facilitate the feeding of a range of sizes with a minimum of abrasion on the casing.

The actual link forming devices constituting a single link forming unit are mounted on a frame comprising the vertical standards 15 and 16 maintained in spaced relation by longitudinal beams 17 and a pair of inclined rails 18 secured to the upper ends of the standards 15 and 16.

Mounted on the standards 15 are bearings 19 having journaled therein a horizontal shaft 20 carrying a pair of spaced apart power-idler sprockets 21. The standards 16 support bearings 22 having journaled therein a shaft 23 which carries a pair of spaced apart driven sprockets 24.

The driving means comprises a motor 25 mounted on a base 26 on the beams 17. The motor is provided with a gear reducing unit 27 from which power is transmitted through pulley 28, belt 29 and pulley 30 to a jack shaft 31 journaled in bearings 32 on the standards 16. The jack shaft 31 is provided with a pinion 33 adapted to mesh with gear 34 on shaft 23 for imparting rotation thereto in the direction of arrow 35.

The conveyer chain 36 on which the linking apparatus is mounted is carried by the sprockets 21 and 24 and comprises a double series of inside links 37 and a double series of connecting links 38 alternately joined together by trunnion pins 39 projecting outwardly and horizontally from the arcuate members 40 which also maintain the two series of links in a spaced relation. Near the forward end of each pair of links 37 and 38 is another arcuated member 41 having outwardly and horizontally projecting lugs for connection to said links by means of screws 43. Positioned between the arcuate members 40 and 41 and adapted to turn therein on bearing surfaces 44 and 45, respectively are the arcuate link-forming drums or molds 46. These drums or molds are of hollow tubular construction and open through both ends.

Each arcuate drum or mold is provided with outwardly extending spiral lugs 47, which are adapted to engage the grooves 47' formed in an arcuate cam 48 which is positioned intermediate the sprockets 21 and 24, underneath the conveyer and fastened to the rails 18. The spiral lugs 47 are alternately left- and right-handed to cause the respective alternate drums to be revolved in opposite directions.

The cam 48 is formed with a downwardly curved channel of semicylindrical curvature running lengthwise of the body of the cam and the axes of the drums and its spirally guiding features in the form of projecting ridges and spaces more clearly illustrated in Fig. 4 of the drawings are so shaped as to provide paths for the spiral lugs 47 and so directing the latter as to cause the drums passing through the channeled part of the cam to turn on their axes while passing through the channeled part of the cam.

In passing through the channeled part of the cam 48 each drum is turned in one direction by the cam acting features on one side of the cam co-acting with one of the lugs 47. After the turning of a drum in one direction the lug 47 through the action of which the drum is turned leaves the cam acting surfaces on one side of the cam and becomes inactive while the opposite lug 47 engages with the co-acting elements on the other side, and, as the drum continues its progress causes the drum to rotate in the other direction. The rotation therefore of each drum is alternately in opposite directions. This is an important feature of my link forming machine in that it prevents the untwisting of the links from each other—the neck twist of one sausage unit in one direction at one end resisting any tendency of the sausage to turn and untwist in the opposite direction.

Each connecting link 38 is provided with a guide bracket 49 adapted to engage guiding flanges 50 on the sides of the cam structure to prevent the links from twisting and other parts from being displaced during the revolution of the drums.

Each drum or mold 46 is provided with a pair of sausage grippers 51 pivotally mounted at the lower part of the drum as shown more particularly in Fig. 8. These grippers are in the form of clamps having wide curved jaws which closely embrace the sausages when closed thereon—the gripper jaws being provided with depending lugs 54 adapted to be brought together, to open the jaws by cam member 63 with which the lugs engage initially to admit the sausage casing to a receiving drum and within the grasp of a gripper clamp, it being understood that each drum as it reaches a starting point in a cycle of operations has its gripper clamping jaws closed and that these must be automatically opened to admit a section of stuffed sausage and maintained in open position by the cam member 63. The latter consists of a longitudinally channeled member with side walls in parallel relation and between which the lugs 54 travel as the conveyer progresses in its paths until on leaving the cam at its forward end the lugs diverge and the clamping jaws of the gripper are closed inwardly and caused to clamp the sausage unit lying between them. The cam or guide 63 is of arcuate form longitudinally and at its lug admitting end is flared outwardly to provide for the entry of the lugs without obstruction. It is to be understood that in feeding the sausage casings with their contents to the linking devices, it is necessary to have the gripper jaws open as the sausage casings are passed into the drums through the gaps at the upper part of the drums and between the gripper jaws, to be afterwards closed over the contained sausage section, to grip the latter and hold it in position during the twisting operation, following the formation of the sausage necks, produced by the pinching members.

As previously indicated, the pinching members 57 are carried by pins 56 and are normally maintained in open or separated position by suitable spring means. These pinching members are of blade formation preferably padded on their sides and edges by rubber or other suitable padding to prevent abrasure of the sausage casings.

It will be understood that, in carrying into effect the process of link formation on which my invention is based, the first step or series of steps relate to the formation of the flattened necks of the sausage units. This flattening is accomplished by means of the pinching members and their actuating devices 61, herein referred to as "cams". These devices consist of the bars or strips 61 located outside the carrier chain and converging towards their inner ends. As the drums progress the projecting ends of the pinching pins 56, which are in contact with the inner surfaces of the cam members 61 are moved inwardly in a gradual manner a sufficient distance to adequately flatten the neck portions of the sausage casing and force the sausage filling apart at the point of twisting.

The convergence of the cam strips 61 terminates at its inner end in an offset 62 of step formation by which the pinching fingers are slightly released from pressure to permit of the twisting of the sausage casing at the proper points. At the same time the grippers are closed by the lugs leaving the cam devices 63 and the springs 53 exerting their pressure on the jaws of the gripper clamp. Further advancement of the carrier or conveyer brings the lugs 47 into engagement of the spirally grooved cam surfaces 48 causing each alternate drum 46 to make two revolutions in opposite directions thus making four complete twists on the casing. After the twist is completed the pinching devices are released entirely from inward pressure from their restraining cams 61 and at the same time the grippers 51 are released by means of lugs 54 engaging cams 64, allowing the linked sausages to be removed from the conveyer.

Figure 9:
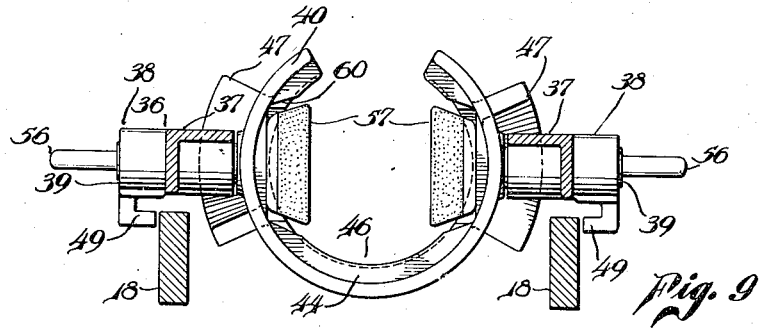
Fig. 9 is a section on line 9—9 in Fig. 2, showing the pinching members in their fully retracted position.
Figure 6:
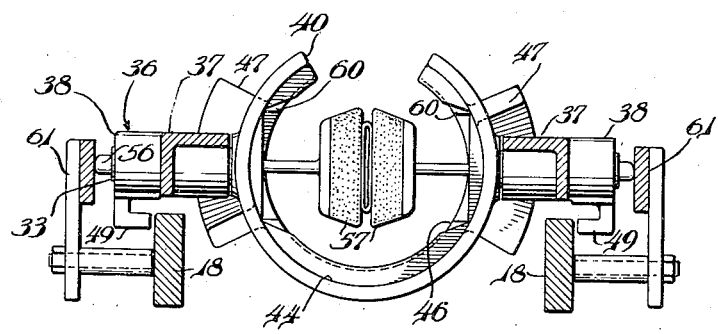
Fig. 6 is a section on line 6—6 of Fig. 2, illustrating the pinching mechanism.
Figure 5:
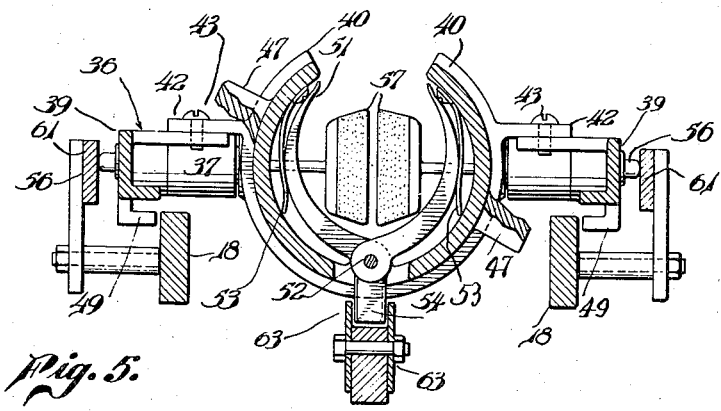
Fig. 5 is a section on line 5—5 of Fig. 2, illustrating the linking mechanism in detail.

It will be noted that the arcuate members 40 and 41 and the arcuate or cylindrical drums have gaps at the top to receive the stuffed casings. To insure the upward position of the gaps in the drums 46, notches 60 are provided on the inner periphery of the drums for fingers 57 to slip into when fully retracted as shown in Fig. 9, such retraction occurring at the end of the link twisting operation, when the link forming devices have completed their work, and as provided for the gaps in the arcuate members are uppermost.

This upward position of the gaps is maintained until the drums have returned to their starting positions with the clamping jaws closed, to be opened by the entry of the lugs 54 between the side walls of the cam 63, for the reception of the stuffed sausage casing, and maintained in open position during the travel of the drums to the twisting point and while the neck portions of the sausage casing are being produced. It is to be understood that each drum arrives at its discharge point on the conveyer with its feeding and discharge gap uppermost and the gripper open, such opening being effected by the entry of the lugs 54 between the walls of a cam element or guide 64 which is similar to the cam element 63. This opening of the gripper jaws entirely releases the sausages in link formation, from the drums and allows them to fall into a proper receiver or become subject to other treatment.

On the reverse movement of the conveyer the drums may be passed through a water bath 65 for cleaning purposes.

The foregoing description has been limited to the construction and operation of a single, self-contained unit but as the main object of the invention is to produce linked sausages on an extensive scale and in the most expeditious and economical manner I propose and have devised a construction and operation whereby a large number of such units may be assembled as a plant or battery with the several units arranged in parallel relation and operated from a single source of power communicated from such source through the sprocket instrumentalities of a master unit. Under this system it is not only possible and practicable to operate many units at a time but is possible and practicable to produce by the one assembly links of different lengths in separate units and to selectively operate any one or more of the units.

Figure 14:
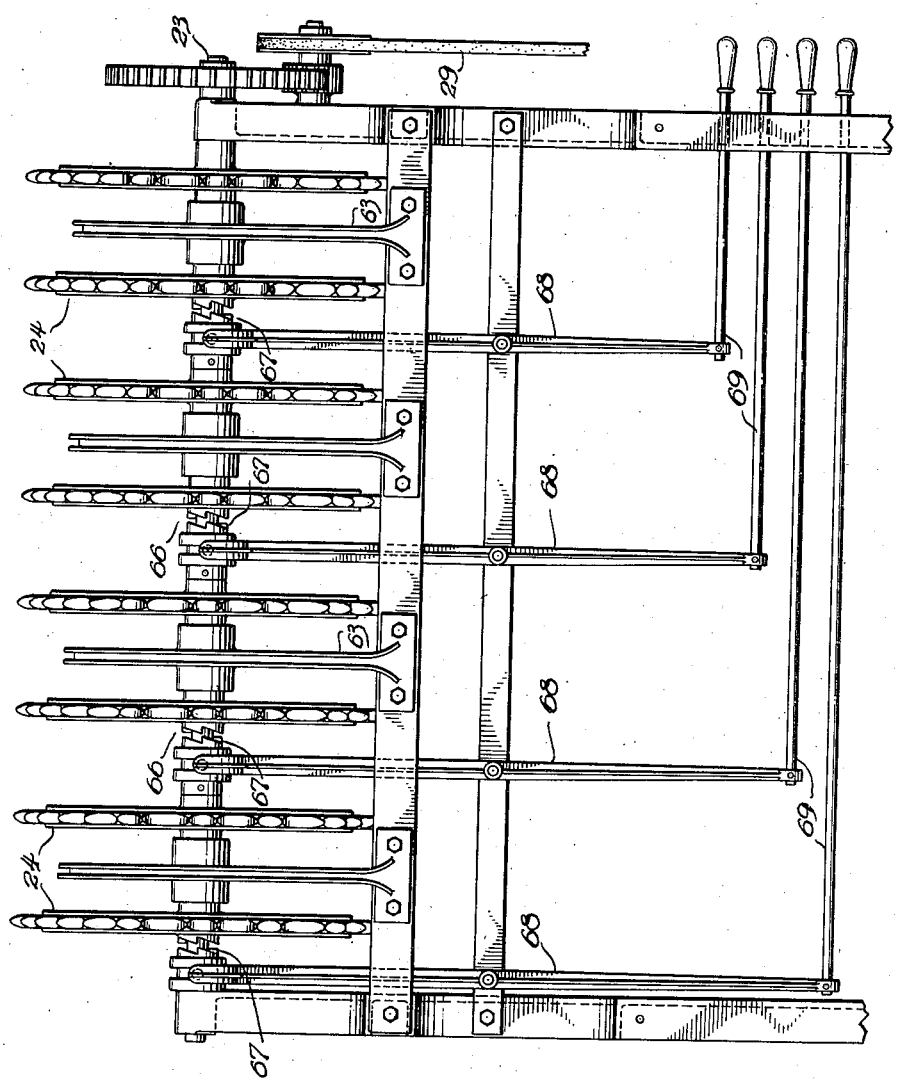
Fig. 14 is a plan view of a group of link forming units operable from a single driving shaft and its connections.

The different units are brought into requisition by means of the clutch mechanism shown in Fig. 14. According to the arrangement therein illustrated the drive shaft 23 mounted on the frame of the machine and of sufficient length for the purposes intended has mounted loosely thereon the sprocket wheels 24 of the several units. Attached to the hub of one of the sprocket wheels of each pair is a toothed clutch member 66 and splined on the drive shaft 23 is a complementary clutch member 67, which rotates with the drive shaft 23 and is adapted to be brought into engagement with the matching clutch member 66 and connected sprocket wheel to cause rotation of the latter, such engagement being effected by the operation of the clutch levers 68 and handle bars 69, located within convenient access of the operator.

Having fully described my invention I claim as new and desire to secure by Letters Patent:

1. A sausage link forming machine comprising a supporting frame, an endless conveyer of chain formation mounted on said frame, and composed of pivotally connected links, a series of arcuately formed drums carried by said conveyer and arranged and adapted for the reception of stuffed sausage casings in untwisted lengths, means for feeding said casings to said drums, means for pinching said casing at determined points to initially segregate the sausage units and form neck contractions between the same, said pinching means being arranged and adapted to compress the neck portions by gradually increased pressure, means for gripping and holding the casing in untwisted position during the neck formation by the pinching means, automatic means for partially releasing said casings from the gripping devices, and means for rotating the drums in successive order to twist the neck portions of the contained units while the other units are under restraint.

2. In a sausage link forming machine comprising an endless chain having inner and outer links on each side and carrying a series of sausage linking drums, arcuate transverse members connecting the links on opposite sides of the chain and constituting the bearings for the drums, in which the drums are adapted to be rotated one of the said arcuate members being coupled to its supporting link by pintle connection at its ends and being provided with spring controlled pintle pins carrying sausage pinching fingers, and means being provided for forcing said pinching fingers against the sausage casings with gradually increasing pressure to flatten the same at the neck forming points.

3. A sausage link forming machine comprising a supporting frame, an endless conveyer of chain formation mounted on said frame, means for driving said conveyer, including sprocket wheels engaging the chain links, arcuate drum supporting members carried by said chain, rotary sausage holding drums supported in series by said arcuate members, means for feeding stuffed, unlinked sausage lengths to said drums, automatically operated means mounted on the drums for the purpose of gripping and clamping the sausage casings previously to the formation of the necks of the sausage units, means for pinching the sausage casings at predetermined points to produce untwisted necks, means for partially relaxing the pressure of the gripping and clamping devices on the casing, means for rotating the drums and contained sausage units while the travel of the conveyer is in progress and after the formation of the flattened necks of the sausage casing, and means for wholly releasing the sausage units from the hold of the gripping and clamping devices and from the drums.

4. In a sausage link forming machine according to claim 3 means for locking the drums from rotation after the operation of twisting devices and means for unlocking said drums at predetermined periods.

5. A mechanical sausage link forming system comprising a plurality of link forming units, each embodying the features recited in claim 1 assembled in group formation and operated from a single source of power and provided with means for selectively operating the units.

6. A sausage link forming system, in which a plurality of link forming units, of the character claimed in claim 1 are assembled in group formation, and operated from a single source of power and in which may be embraced units of different sausage length producing capacity, clutch mechanism being provided whereby the link producing units may be selectively operated.

JOSEPH H. MILLER.